Nov. 14, 1967  R. A. CRESSWELL  3,352,110
GAS TURBINE BY-PASS ENGINE
Filed Jan. 4, 1965  2 Sheets-Sheet 1
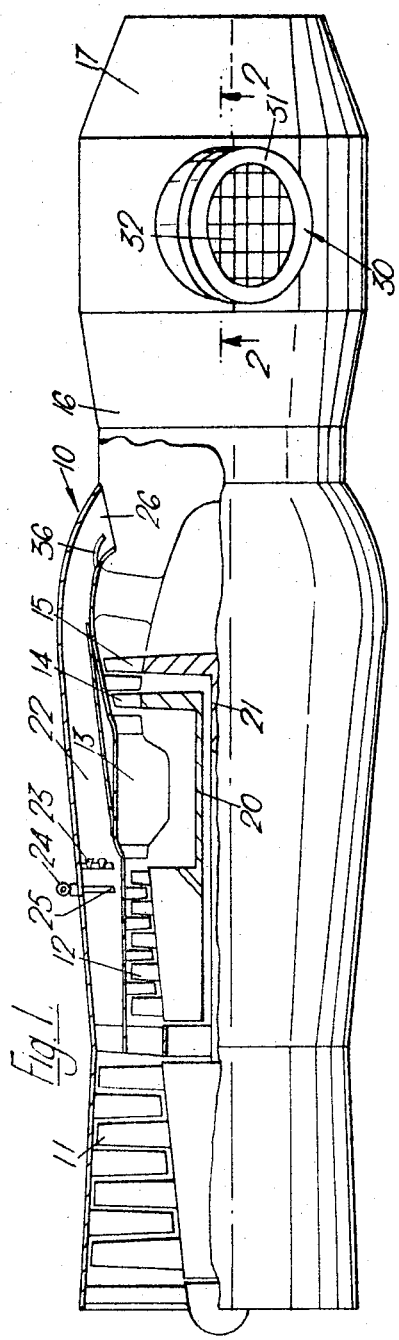
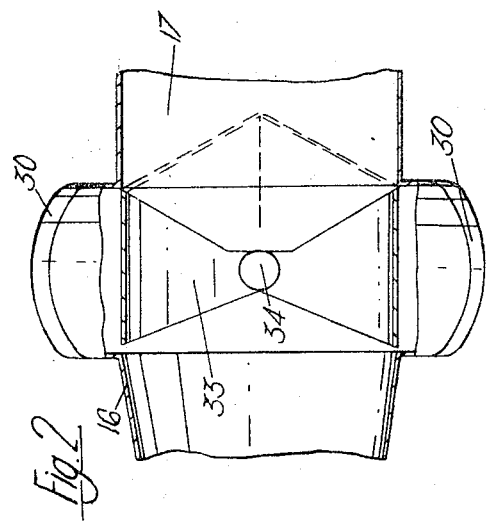
Inventor
Roger Anthony Cresswell
By
Cushman, Darby & Cushman
Attorneys

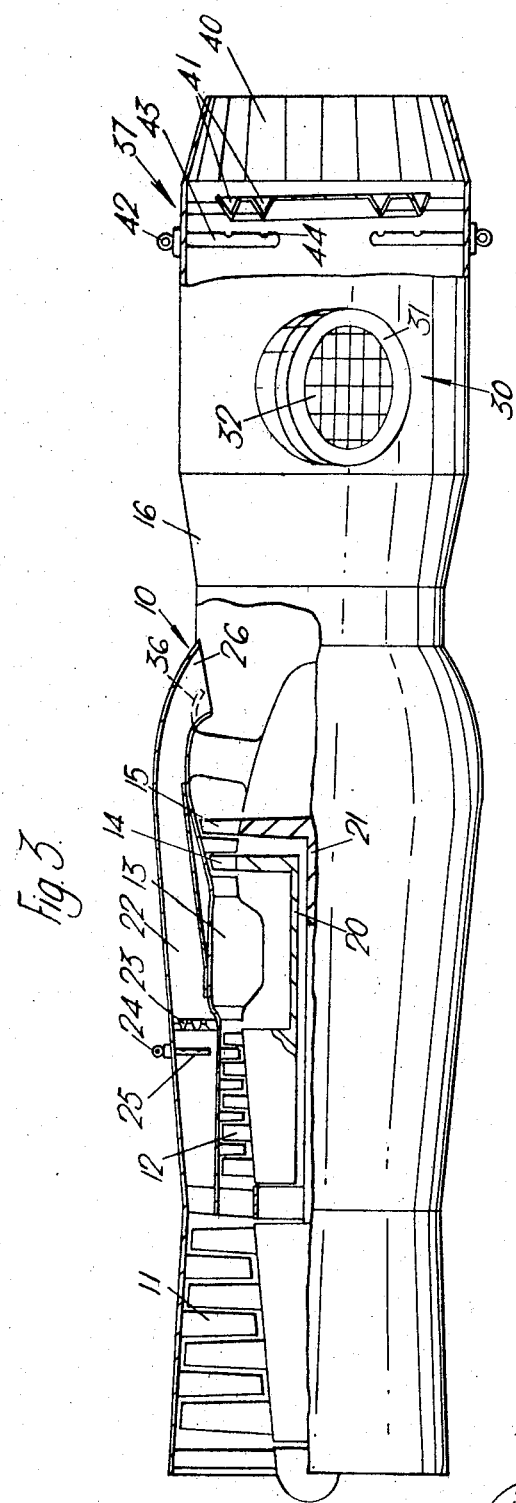

United States Patent Office 3,352,110
Patented Nov. 14, 1967

3,352,110
GAS TURBINE BY-PASS ENGINE
Roger Anthony Cresswell, Derby, England, assignor to Rolls-Royce Limited, Derby, England, a British company
Filed Jan. 4, 1965, Ser. No. 423,156
Claims priority, application Great Britain, Feb. 5, 1964, 4,988/64
7 Claims. (Cl. 60—229)

This invention concerns a gas turbine by-pass engine.

According to the present invention, there is provided a gas turbine by-pass engine comprising compressor means, main combustion equipment, turbine means, and an exhaust duct, a main propulsion nozzle, all arranged in flow series, a by-pass duct whose upstream end is arranged to receive air compressed in the compressor means, the by-pass duct by-passing the main combustion equipment and the turbine means; by-pass combustion equipment arranged in the by-pass duct; and at least one additional nozzle which is adapted for the passage therethrough of both air which has been heated by the main combustion equipment and air which has been heated by the by-pass combustion equipment.

Preferably, the downstream end of the by-pass duct communicates with the exhaust duct by way of mixer means whose outlet area may be varied, the additional nozzle or nozzles communicating with the exhaust duct and being arranged downstream of the downstream end of the by-pass duct.

A valve device is preferably mounted in the exhaust duct, the valve device being movable between a first position in which all the gases in the exhaust duct are directed to atmosphere through the main propulsion nozzle and a second position in which all the said gases are directed to atmosphere through the additional nozzle or nozzles.

The or each additional nozzle preferably has a fixed total throat area which is matched to the flow of hot gases which occurs therethrough when said valve device is in said second position and said by-pass combustion equipment is operative.

The main propulsion nozzle may have a fixed throat area which is matched to the flow of hot gases which occurs therethrough when said valve device is in its first position and said by-pass combustion equipment is inoperative.

Alternatively, reheat combustion equipment may be mounted in the exhaust duct, downstream of the said valve device, the said main propulsion nozzle being a variable area nozzle.

Preferably there are two additional nozzles which are spaced diametrically of the exhaust duct.

The or each additional nozzle is preferably adjustable to direct the gases flowing therethrough in desired vertical and horizontal directions. Thus the or each additional nozzle may comprise a rotary member provided with a plurality of deflector vanes.

The engine preferably has low and high pressure compressors which are respectively driven by low and high pressure turbines, the upstream end of the by-pass duct being arranged to receive some of the air compressed in the low pressure compressor.

The invention is illustrated, merely by way of example in the accompanying drawings, in which:

FIGURE 1 is a diagrammatic view, partly in section, of one embodiment of a gas turbine by-pass engine according to the present invention, FIGURE 2 is a diagrammatic view, mainly in section, taken on the line 2—2 of FIGURE 1, and FIGURE 3 is a diagrammatic view, partly in section, of another embodiment of a gas turbine engine according to the present invention.

Referring to the drawings, a gas turbine by-pass engine 10 is provided with a low pressure compressor 11, a high pressure compressor 12, main combustion equipment 13, a high pressure turbine 14, a low pressure turbine 15, an exhaust duct 16, and a main propulsion nozzle 17, all arranged in flow series.

The high pressure turbine 14 drives the high pressure compressor 12 through a shaft 20, while the low pressure turbine 15 drives the low pressure compressor 11 through shaft 21 which is mounted concentrically within the shaft 20.

The upstream end of a by-pass duct 22 is arranged to receive some of the air compressed in the low pressure compressor 11. The by-pass duct 22, which by-passes the main combustion equipment 13 and the turbines 14, 15 has downstream facing V-section concentrically arranged annular gutters 23 mounted therein. A fuel manifold 24 supplies fuel to a plurality of angularly spaced apart stub pipes 25 which have apertures through which the fuel may enter the by-pass air flowing through the by-pass duct 22. The fuel is carried by this air to the downstream side of the gutters 23, where combustion occurs.

The downstream end of the by-pass duct 22 communicates with the exhaust duct 16 by way of a plurality of angularly spaced apart mixer means 26 whose outlet areas may be varied by pivoted flaps 36, each of the mixer means terminating substantially adjacent the peripheral extremity of the exhaust duct at the points of communication.

Two diametrically spaced apart additional nozzles 30 communicate with the exhaust duct 16 at points substantially downstream of the downstream end of the by-pass duct 22. Each of the additional nozzles 30 comprises a rotary member 31 having a plurality of deflector vanes 32. Rotation of the rotary members 31 causes gases flowing through the additional nozzles 30 to be directed in desired vertical and horizontal directions. Thus, by appropriate disposition of the rotary members 31, the said gases may be downwardly directed for vertical lift, rearwardly directed for forward flight, and forwardly directed for braking. The additional nozzles may, for example, be formed as disclosed in our U.S. Patent 3,130,543.

Mounted in the exhaust duct 16, adjacent the downstream end thereof, is a valve device constittued by a pair of "eyelid" members 33, the eyelid members 33 being mounted on common diametrically oppositely disposed pivots 34.

The eyelid members 33 are movable between two positions. When the eyelid members 33 are disposed in the full line position shown in FIGURE 2, all the gases in the exhaust duct 16 are directed to atmosphere through the main propulsion nozzle 17 and none of these gases may flow through the additional nozzles 30. When, however, the eyelid members 33 are disposed in the position indicated by dotted lines, all the gases in the exhaust duct 16 are directed to atmosphere through the additional nozzles 30.

The arrangement is such that, during ordinary forward flight, the eyelid members 33 are disposed in their full line position, the by-pass combustion equipment constituted by the parts 23–25 is not employed, and the flaps 36 are disposed so that the outlet areas of the mixer means 26 are at a minimum.

During short or vertical take-off or landing, however, the said by-pass combustion equipment is brought into operation, the eyelid members 33 are disposed in their dotted line position, and the flaps 36 are disposed so that the outlet areas of the mixer means 26 are at a maximum.

The rotary members 31 will gradually be rotated during short take-off between the positions in which they direct these hot gases vertically downwardly and the positions in which they direct the gases rearwardly. When the aircraft has gained sufficient height, the by-pass combustion equipment 23–25 is shut down, the eyelid members 33 are restored to their full line position, and the flaps 36 are disposed so that the outlet areas of the mixer chutes 26 are at a minimum.

Each of the additional nozzles 30 has a fixed total throat area which is matched to the flow of hot gases which occurs therethrough when the eyelid members 33 are disposed in their dotted line position and the said by-pass combustion equipment 23–25 is operative. Moreover, the main propulsion nozzle 17 has a fixed throat area which is matched to the flow of hot gases which occurs therethrough when the eyelid members 33 are disposed in their full line position and said by-pass combustion equipment 23–25 is inoperative.

In FIGURE 3 there is shown a gas turbine by-pass engine which is generally similar to that of FIGURES 1 and 2 and which will not therefore be described in detail, like reference numerals indicating like parts.

In the FIGURE 3 construction, however, the exhaust duct 16, on the downstream side of both the additional nozzles 30 and of the eyelid members 33, has reheat combustion equipment 37 mounted therein, the downstream end of the exhaust duct 16 being provided with a variable area main propulsion nozzle 40 whose area may be altered to match the flows of hot gases which occur therethrough when the reheat combustion equipment 37 is respectively fully or partially operative and fully inoperative.

The reheat combustion equipment 37 comprises concentrically arranged annular gutters 41, and a fuel manifold 42 which supplies fuel to a plurality of angularly spaced apart stub pipes 43 which have apertures 44 therein. Fuel which has flowed through the apertures 44 is carried through the exhaust duct 16 by the exhaust gases therein to the downstream side of the gutters 41 where reheat combustion occurs.

I claim:

1. A gas turbine by-pass engine comprising compressor means, main combustion equipment, turbine means, an exhaust duct, and a main propulsion nozzle, all arranged in flow series, a by-pass duct having an upstream end for receiving air compressed in the compressor means, said by-pass duct by-passing the main combustion equipment and the turbine means, mixer means having a variable outlet area and communicating the downstream end of the by-pass duct with the exhaust duct, by-pass combustion equipment arranged in the by-pass duct, at least one additional nozzle communicating with the exhaust duct and arranged downstream of the mixer means, and a valve device mounted in the exhaust duct and movable between a first position in which all the gases in the exhaust duct are directed to atmosphere through the main propulsion nozzle and a second position in which all the said gases are directed to atmosphere through the said at least one additional nozzle, said at least one additional nozzle having a fixed total throat area which is matched to the flow of hot gases which occurs therethrough when said valve device is in said second position and said by-pass combustion equipment is operative and said variable outlet area of the mixer means being adjusted to a maximum when the by-pass combustion equipment is operative and to a minimum when the by-pass combustion equipment is inoperative.

2. A gas turbine by-pass engine as claimed in claim 1 in which reheat combustion equipment is mounted in the exhaust duct downstream of the said valve device.

3. A gas turbine by-pass engine as claimed in claim 1 in which there are two of said additional nozzles communicating with the exhaust duct and spaced diametrically thereof.

4. A gas turbine by-pass engine as claimed in claim 1 in which said at least one additional nozzle is adjustable to direct the gases flowing therethrough in desired vertical and horizontal directions.

5. A gas turbine by-pass engine as claimed in claim 1 in which the compressor means comprise a low pressure compressor and a high pressure compressor in flow series and the said turbine means comprise in flow series a high pressure turbine drivingly connected to the high pressure compressor and a low pressure turbine drivingly connected to the low pressure compressor.

6. An engine as claimed in claim 1 in which the main propulsion nozzle has a fixed throat area which is matched to the flow of hot gases which occurs therethrough when said valve device is in its first position and said by-pass combustion equipment is inoperative.

7. An engine as claimed in claim 1 in which said at least one additional nozzle comprises a rotary member provided with a plurality of deflector vanes.

References Cited

UNITED STATES PATENTS

| | | |
|---|---|---|
| 3,054,254 | 9/1962 | Hopper. |
| 3,118,276 | 1/1964 | Keenan et al. |
| 3,130,543 | 4/1964 | Oldfield et al. _____ 60—35.55 |

FOREIGN PATENTS

| | | |
|---|---|---|
| 908,307 | 10/1962 | Great Britain. |
| 928,475 | 6/1963 | Great Britain. |
| 935,544 | 8/1963 | Great Britain. |

MARK M. NEWMAN, *Primary Examiner.*

D. HART, *Assistant Examiner.*